United States Patent [19]
Herder et al.

[11] Patent Number: 5,986,644
[45] Date of Patent: Nov. 16, 1999

[54] REMOTE CONTROL SYSTEM

[75] Inventors: Lisa A. Herder, Wolfeboro, N.H.; Paul H. Magnant, Richmond, Vt.; Harve P. Simmons, Williston Park, N.Y.

[73] Assignee: Selectech, Ltd., Vt.

[21] Appl. No.: 08/903,052

[22] Filed: Jul. 30, 1997

[51] Int. Cl.⁶ .................................................. G09G 5/08
[52] U.S. Cl. .......................... 345/158; 345/156; 345/157; 345/163; 345/168; 463/39; 273/148 B
[58] Field of Search .................................. 345/156, 157, 345/158, 163, 161, 168; 463/39; 273/148 B

[56] References Cited

U.S. PATENT DOCUMENTS

| | | | |
|---|---|---|---|
| Re. 32,633 | 3/1988 | Hovey et al. | 340/710 |
| 3,987,685 | 10/1976 | Opocensky | 74/471 R |
| 4,464,652 | 8/1984 | Lapson et al. | 340/710 |
| 4,578,674 | 3/1986 | Baker et al. | 340/710 |
| 4,588,187 | 5/1986 | Dell | 273/1 |
| 4,754,268 | 6/1988 | Mori | 340/710 |
| 4,924,216 | 5/1990 | Leung | 340/709 |
| 5,045,843 | 9/1991 | Hansen | 340/709 |
| 5,049,863 | 9/1991 | Oka | 345/168 |
| 5,092,779 | 3/1992 | Piwonka et al. | 434/352 |
| 5,359,348 | 10/1994 | Pilcher et al. | 345/158 |
| 5,421,590 | 6/1995 | Robbins | 273/438 |
| 5,563,630 | 10/1996 | Tsakiris et al. | 345/160 |
| 5,706,026 | 1/1998 | Kent et al. | 345/156 |
| 5,793,355 | 8/1998 | Youens | 345/156 |
| 5,796,387 | 8/1998 | Curran et al. | 345/157 |

OTHER PUBLICATIONS

Reexamination Certificate (2956th) B1 5,045,843 to Hansen, issued Jul. 16,1996.

*Primary Examiner*—Bipin H. Shalwala
*Assistant Examiner*—Kent Chang
*Attorney, Agent, or Firm*—H. Jay Spiegel

[57] ABSTRACT

A remote control system for providing information to an electronic apparatus such as a PC, Net computer or video game. The system includes a remote controller for generating an IR signal containing information usable by the apparatus, including cursor position information, select commands and other information. The system also includes a primary controller that is connected to the electronic apparatus typically, but not necessarily, by a cable. The primary controller includes a secondary controller having a movable element. The secondary controller generates relative position information based on the position of the movable element. The primary controller also receives the IR signal from the remote controller, converts this signal into electronic form, and then provides this signal to the electronic apparatus. The primary controller, in one embodiment, allocates control between the secondary controller and the remote controller such that the electronic apparatus receives information from only one of the secondary controller and remote controller at a given time.

24 Claims, 4 Drawing Sheets

REMOTE CONTROL SYSTEM

FIELD OF THE INVENTION

The present invention relates to remote wireless control devices capable of remotely transmitting and receiving data from an electronic device via an encoded beam of infrared ("IR") light, and to control devices for transmitting and receiving data from an electronic device via a cable.

BACKGROUND OF THE INVENTION

Remote control devices such as a mouse, a trackball and a joystick are widely used to control PCs, Net computers, video games and other electronic apparatus. These devices convert relative movement of a movable element, e.g., the ball projecting from the bottom of a mouse, into an electronic signal containing relative position information. This information is then conveyed via a cable to the electronic apparatus for use in controlling cursor position, selecting a graphical image such as icon or hypertext link or otherwise controlling the operation of the electronic apparatus. For example, U.S. Pat. No. 5,421,590 discloses multiple game controllers for controlling an electronic computer game device, wherein the controller are connected in a series by a wire to one another and also connected by wire to a computer.

It is also known in the art of electronics to control electronic apparatus remotely via a controller having an IR transmitter that transmits information encoded onto an IR light beam to an IR receiver that is connected to or is integral with the electronic apparatus. For example, U.S. Pat. No. 4,754,268 to Mori discloses a "wireless mouse," i.e., a controller for a computer that moves over a surface and allows for the user to control certain functions of the computer by pressing one or more keys. U.S. Pat. No. 5,563,630 discloses a hand-held IR remote mouse controller which sends an IR signal to a mouse receiver, the signal containing information regarding standard mouse operations, such as "clicking" and "clicking and dragging."

Furthermore, it is known that data can be transferred back and forth between a remote control unit and an electronic apparatus, where each has an IR transmitter and receiver capable of transmitting and receiving an encoded IR light beam. Such two-way IR signal transmission may be used for "absolute" position control, as may be achieved using devices of the type described in U.S. Pat. Nos. 5,045,843 and 5,359,348 and in Reexamination Certificate B1 U.S. Pat. No. 5,045,843.

One of the main shortcomings of the above-cited U.S. patents for remotely and wirelessly controlling electronic devices is that the remote controller must communicate directly with a receiver or a transmitter/receiver connected with or integral to the electronic device. The need to use such a separate receiver or transmitter/receiver can be annoying to the user and unsightly. In addition, such separate device adds to the cost of the remote control system.

SUMMARY OF THE INVENTION

The present invention is a controller system for providing information to an electronic apparatus such as a PC, Net computer or video game. The system comprises a remote controller for providing a first infrared signal containing information usable by the electronic apparatus and a primary controller that is connectable to the electronic apparatus. The primary controller includes (a) a secondary controller with at least one movable element and (b) a transducer associated with the at least one movable element for providing a second signal containing information regarding the position of the at least one movable element. The primary controller also includes an IR communication section connected to the transducer (1) for receiving the first infrared signal, (2) for generating a third signal containing information in the first infrared signal and (3) for providing a fourth output signal comprising at least one of the second and third signals.

With the present controller system, cursor location, select commands and other information may be provide to the electronic apparatus via either the remote controller or the primary controller. The remote controller may provide either relative or absolute cursor location information. Depending upon the device drivers installed in the electronic apparatus, the primary controller either provides absolute cursor location information directly to the apparatus or converts such information into relative cursor location information.

DETAILED DESCRIPTION OF THE INVENTION

Figure 1:
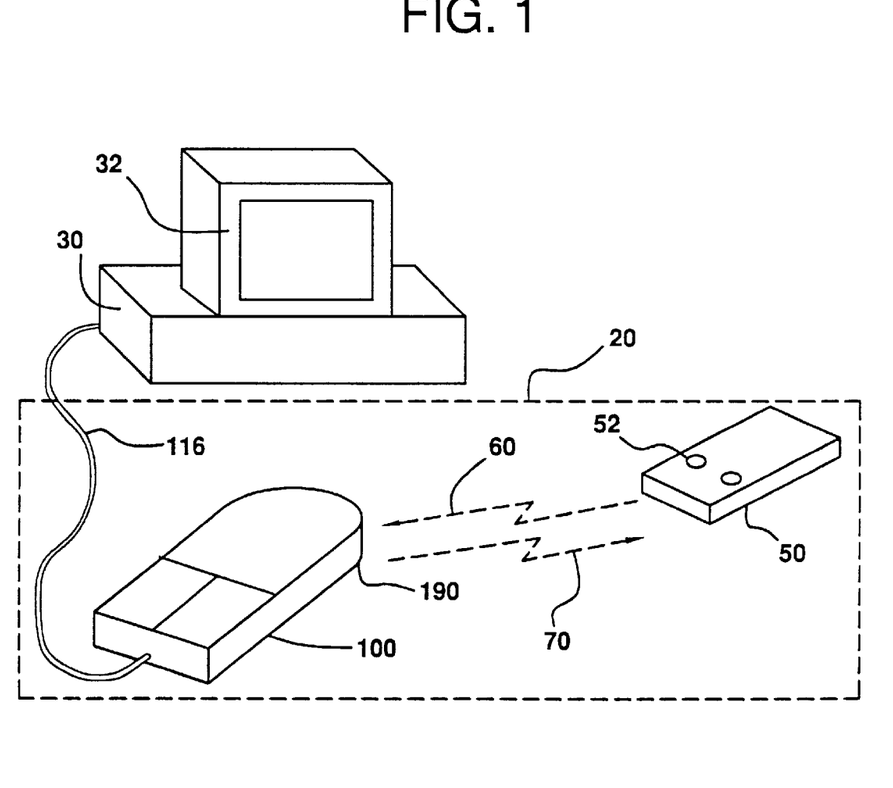
FIG. 1 is a idealized perspective view of the remote control system.

Referring to FIG. 1, the present invention is an IR electronic remote communication system 20 for providing information to, and in some embodiments receiving information from, an electronic apparatus 30 such as a PC or a Net computer. System 20 includes a remote controller 50 and a primary controller 100.

Remote controller 50 is capable of remotely and wirelessly transmitting information via an IR signal to apparatus 30. This communication occurs via controller 100 which is connected to apparatus 30. As described in more detail below, controller 100 receives the IR signal from remote controller 50 and transmits information contained in such signal to apparatus 30. In addition, controller 100 provides information to apparatus 30 as a function of the position of a movable element in the controller. In certain embodiments, controller 100 also transmits information received from apparatus 30 to remote controller 50 in the form of an IR signal.

Describing electronic apparatus 30 in more detail, the apparatus may comprise a range of devices including, but not limited to, a PC, a computer workstation, an industrial process control system, a Net computer, a television, a set-top box, a video game device and other video-based consumer electronic products. Typically, but not necessarily, electronic apparatus 30 includes a display 32 for displaying textual information and/or visual images. Electronic apparatus 30 includes a communication bus (not shown) that typically, but not necessarily, supports a standard protocol (i.e., RS232 or USB). Information used to control electronic apparatus 30, and/or information that is processed by and/or displayed by the electronic apparatus is typically provided via the communication bus from a mouse, track ball or other device, or via a keyboard through a separate keyboard port, none of which are shown. Electronic apparatus 30 also includes conventional means (not shown) for handling, processing and storing information such as (a) ASIC, microcontroller or microprocessor chips, (b) memory, (c) graphics devices, and (d) other known devices.

With the increased use of graphic user interfaces for controlling application software and for navigating the World Wide Web, cursor position information and select commands (to select icons, hypertext links or other graphical features) constitute a significant portion of the information users desire to provide by remote control devices such a mouse, trackball or joystick, to electronic apparatus 30. As such, remote controller 50 may comprise a wireless mouse apparatus of the type described in U.S. Pat. No. 4,754,268 to Mori (the '268 Patent) or the computer mouse described in U.S. Pat. No. 5,563,630 to Tsakaris et al. (the '630 Patent), which patents are incorporated herein by reference. The remote wireless mice described in these patents provide "relative" cursor location information. That is, they provide "up," "down," "left," and "right" control signals to the electronic apparatus they control. They do not determine the absolute position of the cursor on the display of the electronic apparatus. In addition, remote controller 50 includes one or more buttons 52 for providing cursor location information and for initiating a select command relative to a selected icon, hypertext link or other graphical feature.

Alternatively, remote controller 50 may be an "absolute" pointing device of the type described in U.S. Pat. No. 5,045,843 to Hansen and U.S. Pat. No. 5,359,348 to Pilcher et al., and in Reexamination Certificate B1 U.S. Pat. No. 5,045,843, which patents and Reexamination Certificate are incorporated herein by reference. Collectively, these patents and the Reexamination Certificate are referred to as the "'348 Patent." Absolute cursor control of the type provided by the apparatus described in the '348 Patent involves two-way communication between remote controller 50 and electronic device 30 such that the remote control device is continuously aware of the position of the cursor, as defined by X and Y coordinates on display 32. With the cursor control device described in the '348 Patent, movement of the device itself causes movement of the cursor on display 32, i.e., no toggle switches or "up," "down," "left," or "right" buttons are depressed to effect control of the cursor. Here too, a button 52 or other device on remote controller 50 is depressed to initiate a select command relative to a graphical image positioned beneath a cursor. To support two-way IR communication between remote controller 50 and the electronic apparatus 30, this embodiment of remote controller 50 is adapted to receive IR signal 70 containing information from electronic apparatus 30. As described in more detail in the '348 Patent, remote controller 50 continuously updates cursor location information contained therein based on information contained in IR signal 70.

In addition to providing cursor location information and select commands, remote controller 50 may include a keypad or keyboard (not shown) or other means for providing additional forms of data to electronic apparatus 30.

Regardless of whether remote controller 50 features relative or absolute cursor control, or whether the remote controller provides just cursor location information and select commands or provides additional data, information is transmitted from remote controller 50 in an infrared signal 60. Cursor location information, select commands and other data are encoded in IR signal 60 via space time modulation at a suitable modulation rate, i.e., 19 KHz. Messages encoded in IR signal 60 include a unique controller identification pulse sequence and a data packet. This pulse sequence and data packet is often referred to as a "report." When IR signal 60 is initially transmitted from remote controller 50, controller identification information is initially provided. Depending upon the nature of the device used as remote controller 50, data packets of varying lengths then follow the identification information. As described above, when relative cursor location information is provided, for example when remote controller 50 is a trackball, toggle switch (between the G and H keys on a keyboard) or a sliding pad control device, the cursor location information message contained in the data packet in the IR signal is provided in the form of "up," "down," "left," and "right" signals. As is known, for some remote, wireless controllers, a new identification pulse sequence is provided with each data packet, with the identification pulse sequence serving to identify the remote device and define the number of pulses contained in the data packet. In other cases, more than one data packet may accompany a given identification pulse sequence.

In a preferred embodiment, remote controller 50 is a remote control device of the type described in the '348 Patent. In this embodiment of remote controller 50, information provided via infrared signal 60 consists of a data packet preceded by an identification sequence of 9 IR pulses, space time modulated so as to uniquely identify remote controller 50. Following the sequence of identification pulses, sequential packets of data, each described by 4–9 space time modulated IR pulses, are provided. Successive data packets are space time modulated at 30 Hz, i.e., spaced by about 33 msec. Each pulse contains 4 bits of information, with 2 pulses containing a bit of information. Because, as noted above, the control device of the '348 Patent features absolute cursor control, the data packets in the preferred embodiment of remote controller 50 define cursor location by absolute X and Y coordinates. Two pulses are required per coordinate, provided as a 4 bit and then a 6 bit pulse. A select command requires one, 4 bit pulse. If data besides cursor location information and select commands is to be transmitted, an entire data packet, i.e., 4–9 pulses, is typically used for each packet of data.

System 20 differs in at least one significant respect from known remote control devices that provide relative cursor control information of the type described in the '268 and '630 Patents and remote control devices adapted to provide absolute cursor control of the type described in the '348 Patent. Unlike known systems where a dedicated box for receiving and transmitting IR signals is typically attached to, or positioned adjacent, electronic apparatus, such signals are transmitted via primary controller 100 to electronic apparatus 30. Because many electronic devices already include a mouse or other peripheral device for providing cursor control and select commands, use of primary controller 100 in this manner avoids the need for a separate IR receiver/transmitter device.

Primary controller 100 may take the form of one of a variety of known devices for providing information to electronic apparatus 30. These devices include, but are not limited to, a mouse, a trackball, a touch pad controller, a joystick, a cursor key controller, a keypad, and a keyboard. In a preferred embodiment of the present invention, as described below, primary controller 100 takes the external form of a conventional mouse. However, regardless of the external shape and operative structure of primary controller 100, the internal components of the various embodiments of the primary controller are essentially the same, as described below.

Figure 2:
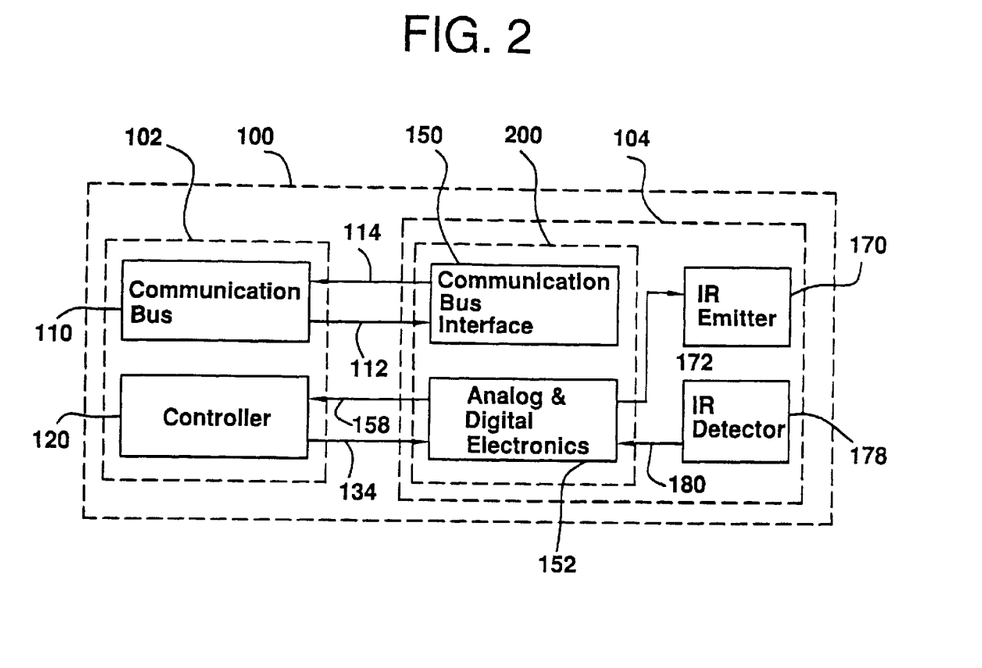
FIG. 2 is a block diagram of the principle elements included in the primary controller.

Referring now to FIGS. 1 and 2, primary controller 100 comprises a position-dependant control section 102 and an IR signal communication section 104. As described in more detail below, position-dependant control section 102 provides information to electronic apparatus 30 that varies as a function of the relative position of one or more movable elements (described below) in the control section. As also described in more detail below, IR communication section 104 receives IR signal 60 from remote controller 50, encodes the information in the IR signal into an electronic signal and provides such signal via control section 102 to electronic apparatus 30. In addition, information generated by electronic apparatus 30 may be encoded into an IR signal by communication section 104 and then transmitted as IR signal 70 to remote controller 50.

Describing position-dependent control section 102 in more detail, the latter comprises a communication bus 110 and a secondary controller 120. The specific design for bus 110 is dictated by the communication protocol of electronic apparatus 30. In a preferred embodiment of the present invention, communication bus 110 is designed to support the known RS 232 communication protocol. Communication bus 110 includes and output line 112 and input line 114, which lines are used to communicate data between control section 102 and communication section 104, as described in more detail below. In addition, signals on communication bus 110 are carried between the bus and electronic apparatus 30 via cable 116. Alternatively, signals on communication bus 110 may be carried between the bus and electronic apparatus 30 utilizing wireless mice devices of the type described in the '268 and '630 Patents.

Figure 3:
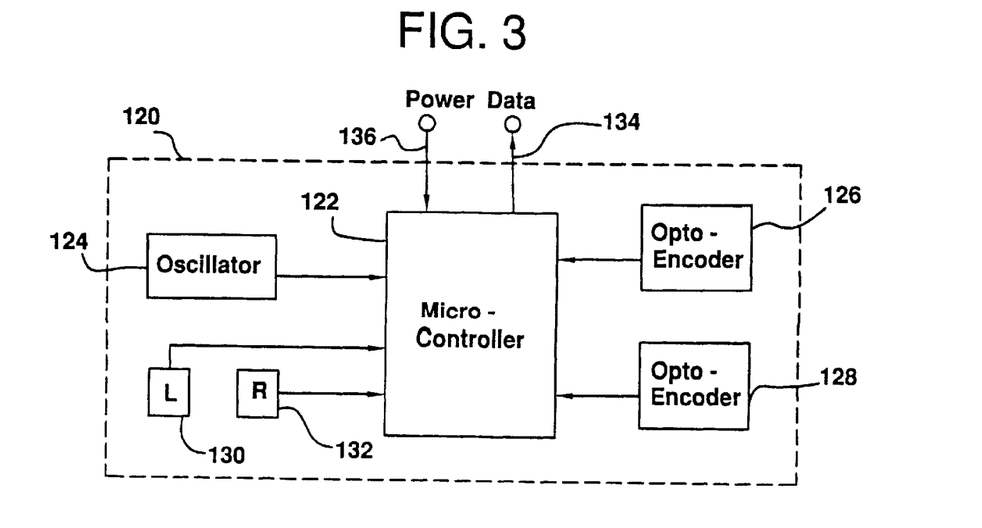
FIG. 3 is a block diagram of the principle elements in the position-dependent control section of the primary controller.

Referring to FIGS. 2 and 3, secondary controller 120 includes the principle elements of known devices for converting relative movement of a movable element into relative position location information used to control the position of a cursor or other movable graphical icon, e.g., a video game figure. Such known control devices also include one or more keys or other actuatable structures for providing select commands, e.g., control commands of the type generated by depressing the left or right button on a mouse.

In a preferred embodiment of the present invention, secondary controller 120 is a controller of the type used in computer mice of the type described in U.S. Pat. Nos. 3,987,685, 4,464,652 and U.S. Pat. No. Re 32,633, which are incorporated herein by reference. A commercial embodiment of a mouse having a controller of the type that may be used as secondary controller 120 is manufactured by Chic Company of Taiwan, model 200. Controller 120 includes a mouse control chip 122, e.g., a chip of the type manufactured by Holtek Microelectronics, Inc. of Taipei, Taiwan, and identified by model number HT6513B. An oscillator 124 is connected to control chip 122 to provide a timing reference signal to the control chip. Secondary controller 120 also comprises X-axis opto-encoder 126 and Y-axis opto-encoder 128. Opto-encoders 126 and 128 are transducers that include rotatably mounted shafts (not shown) that extend perpendicular to one another and engage a rotatably mounted ball (not shown) that projects below the base of the mouse and is caused to rotate by movement of the mouse along a surface. Opto-encoder 126 provides X-axis location information that varies as a function of the angular position of its respective shaft, and opto-encoder 128 provides Y-axis location information that varies as a function of the angular position of its respective shaft. Secondary controller 120 also includes left select button 130 and right select button 132, both coupled with microcontroller 122 for providing first and second select commands to the microcontroller.

Control chip 122 converts the relative X and Y analog position information provided by opto-encoder 126 and 128, and left and right select commands provided via select buttons 130 and 132, respectively, into a digital output signal provided on line 134. Power is provided to secondary controller 120 via line 136.

As noted above, other peripheral devices such as a trackball, joystick and cursor key may be used in place of a mouse in secondary controller 200. With these and other peripheral devices, movement of a movable element(s) included in such devices is converted by one or more transducers into X-Y cursor location information.

Figure 4:
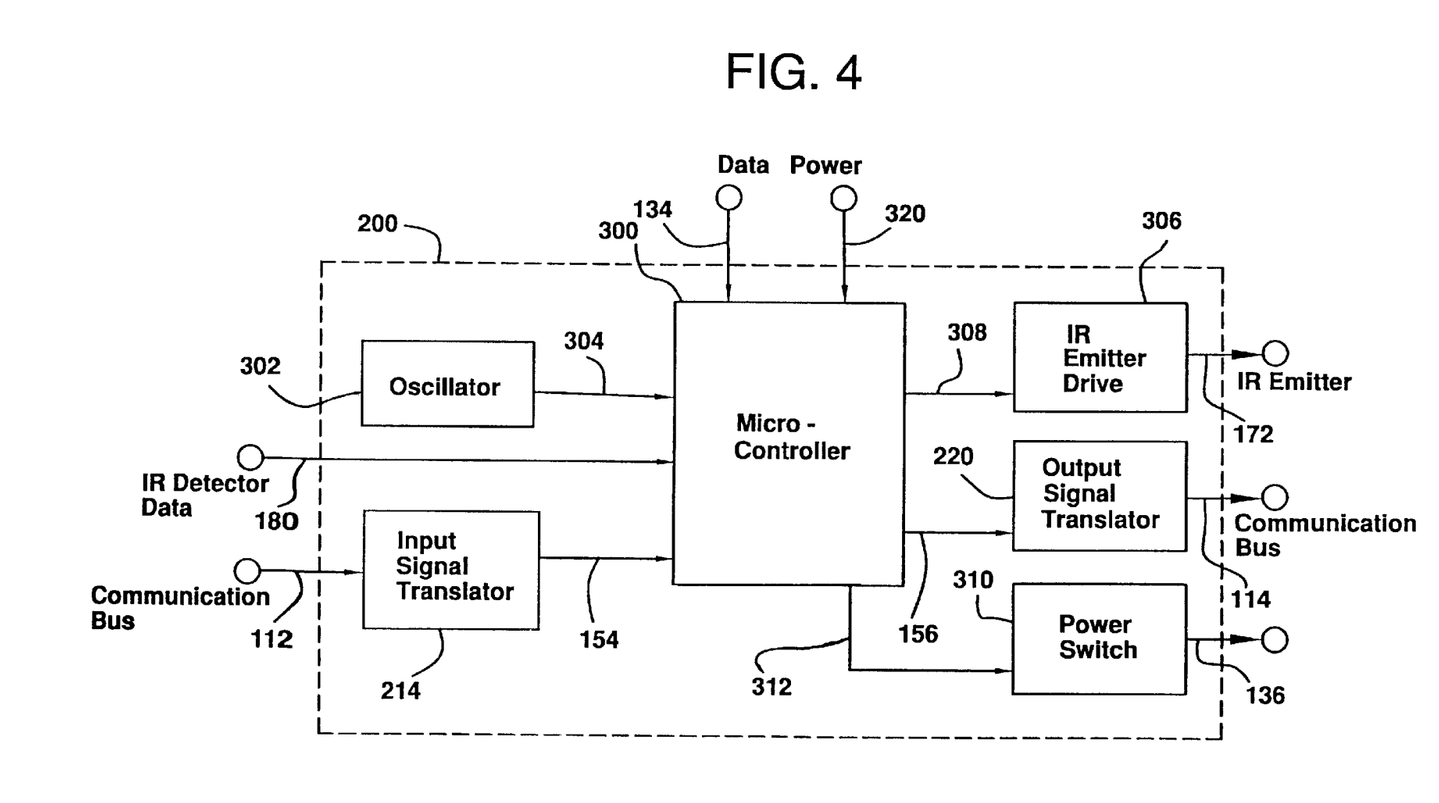
FIG. 4 is a block diagram of the principle elements of the IR signal communication section of the primary controller.

Referring to FIGS. 2–4, while position-dependant control section 102 may be implemented using known elements and/or devices, IR signal communication section 104, a key inventive aspect of primary controller 100, provides unique function and involves a unique collection of elements. Communication section 104 comprises communication bus interface 150 and analog and digital electronics 152, both as described in more detail below. Output signals from communication bus interface 150 are provided via line 154 to analog and digital electronics 152 and output signals from the analog and digital electronics are provided to the communication bus interface via line 156. Analog and digital electronics 152 is connected to output line 134 from controller 120 and provides an output signal to the controller via line 158.

Communication section 104 also includes IR emitter 170 connected with analog and digital electronics 152 via line 172. IR emitter 170 comprises one or more IR-emitting diodes for transmitting IR signal 70 (FIG. 1). To increase the angular extent of IR signal 70, preferably three or more diodes are used, each positioned in angularly displaced relation to the others so that the IR signal 70 has a suitable beam spread.

Communication section 104 further includes IR detector 178 connected via line 180 to analog and digital electronics 152. IR detector 178 is a conventional IR detector of the type sold by the German company, Siemens, and identified by model number SFH506-38. IR detector 178 is positioned on primary controller 100 to receive IR signal 60 (FIG. 1) and includes an A/D converter (not shown) for converting the space time modulated analog information in IR signal 60 into digital form. For other emitters not including an A/D converter, a separate A/D converter is required. Also, A/D conversion may be provided by the microcontroller, described below, in communication section 104, assuming selection of an appropriate microcontroller.

Primary controller 100 includes a housing 190 (FIG. 1) surrounding control section 102 and communication section 104. IR emitter 170 and IR detector 178 may be mounted adjacent apertures (not shown) in housing 190 so as to transmit IR signal 70 and receive IR signal 60 through such apertures. Alternatively, housing 190 may be made from an IR-transparent material, such as undyed ABS plastic, that may or may not be transparent to visible spectrum electromagnetic radiation.

Turning now to FIGS. 1–4, communication interface bus 150 and analog and digital electronics 152 are illustrated in FIG. 2 as two separate elements. In practice, however, communication interface bus 150 and analog and digital electronics 152 are typically implemented on a single printed circuit board, identified schematically as box 200 in FIGS. 2 and 4.

As noted above, communication bus interface 150 performs any necessary signal translation relative to signals received via line 156 from analog and digital electronics 152, and then provides such translated signal via line 114 to communication bus 110. In this capacity, communication bus interface 150 transmits information generated by position-dependant control section 102 and remote controller 50, via analog and digital electronics 152 to communication bus 110. Similarly, communication bus interface 150 provides signal translation with respect to signals received from communication bus 110 via line 112, and provides such translated signals to analog and digital electronics 152 via line 154. As those skilled in the art will recognize, such data translation may involve voltage shifting, amplification, modulation/demodulation, and encoding/decoding.

In one embodiment of communication bus interface 150, the latter includes an input signal translator 214 connected via line 112 with communication bus 110. Signal translator 214 limits the voltage of control and data signals received from communication bus 110 to a level suitable for analog and digital electronics 152, which voltage limited signal is provided via line 154 to the analog and digital electronics. Communication bus interface 150 further comprises an output signal translator 220 connected via line 156 to receive output signals from analog and digital electronics 152. Output signal translator 220 shifts up the voltage signal received from analog and digital electronics 152 to a level suitable for communication bus 110, which voltage shifted signal is provided via line 114 to the communication bus.

With continuing reference to FIGS. 2 and 4, analog and digital electronics 152 includes a microcontroller 300 of the type manufactured by Zilog Corporation, Campbell, Calif., and identified by model number Z86E08. As described in more detail below, microcontroller 300 is used to control the operation of IR signal communication section 104. Analog and digital electronics 152 also includes an oscillator 302 for providing a timing reference signal via line 304 to microcontroller 300.

Analog and digital electronics 152 further comprises an IR emitter drive 306 coupled via line 308 with microcontroller 300. IR emitter drive 306 provides a constant current drive signal for the IR diodes in IR emitter 170, which signal is provided via line 172 to the IR emitter. In addition, analog and digital electronics 152 includes a power switch 310 for providing power to controller 120 via line 136 upon receipt of a suitable enable signal from microcontroller 300 via line 312. Power is provided to microcontroller 300 via line 320, with appropriate power condition circuitry (not shown) typically being provided.

Microcontroller 300 is programmed to perform various control and signal conversion/reformatting functions for primary controller 100. When power is initially applied to microcontroller 300 via line 320, microcontroller places primary controller 100 in a disabled condition. In the disabled condition any input signals provided by controller 120 or received from remote controller 50 via IR detector 178 are ignored. Microcontroller 300 maintains primary controller 100 in the disabled condition until an enable signal is received via communication bus 110 from the electronic apparatus 30 with which primary controller is connected. Upon receipt of such enable signal, microcontroller 300, places primary controller 100 in the enabled condition. Primary controller 100 is returned to the disabled condition either by removing power from microcontroller 300 or when a disable signal is received via communication bus 110. In the enabled condition, IR signal communication section 104 can receive and process data from controller 120, communication bus 110 and IR detector 178 (i.e., information from remote controller 50).

Figure 5:
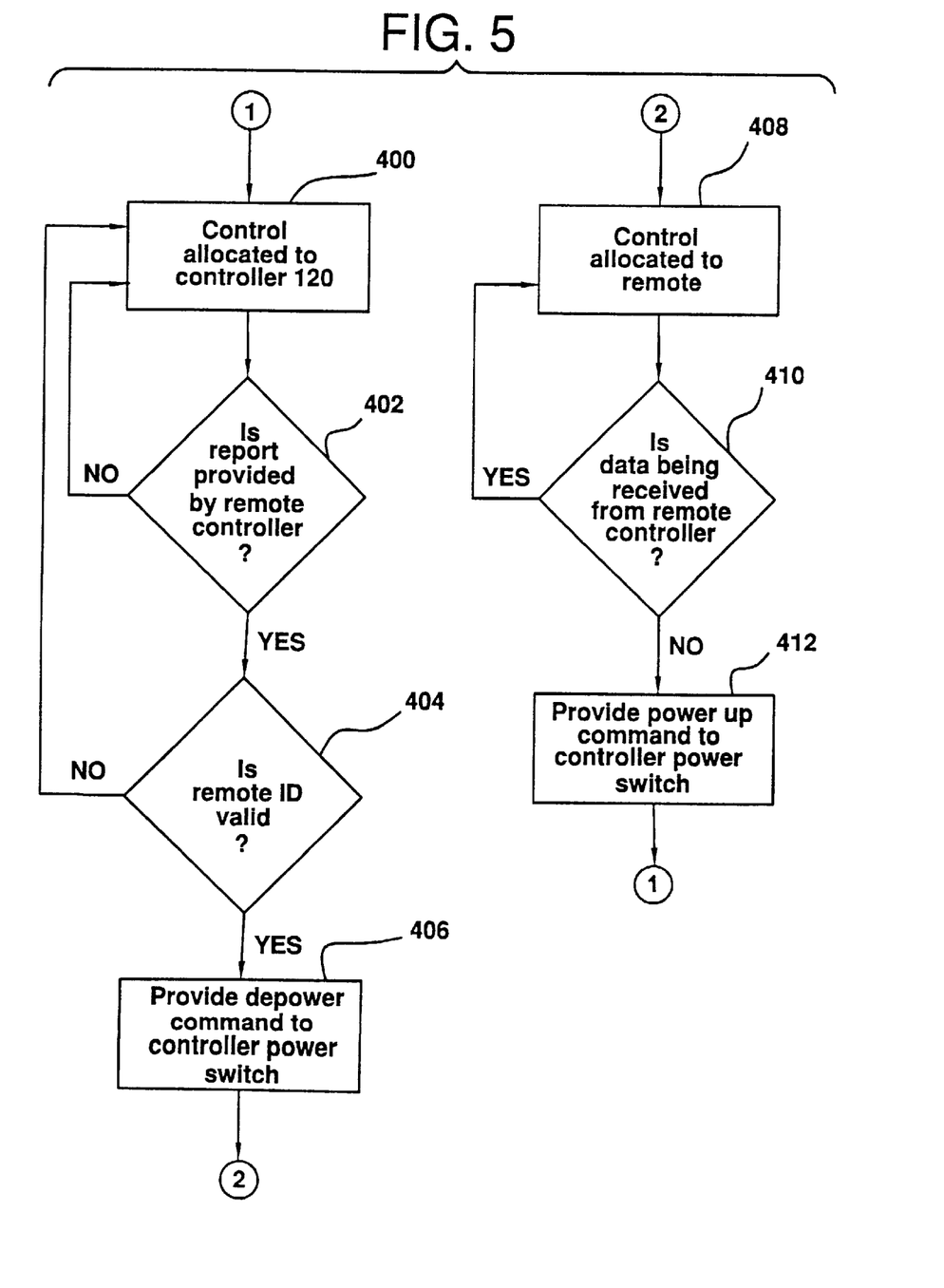
FIG. 5 is a flow diagram illustrating the steps for allocating control between the position-dependent control section of the primary controller and the IR remote control device.

Referring now to FIGS. 2, 4 and 5, microcontroller 300 allocates control between remote controller 50 and secondary controller 120 of primary controller 100 so that cursor location information, select commands and other information is provided from only one of these two sources to electronic apparatus 30. Following receipt of an enable signal via communication bus 112, microcontroller 300 allocates control to secondary controller 120, as indicated by box 400 in FIG. 5. In this state, operation of electronic device 30 may be controlled by select commands received from secondary controller 120 and the position of the cursor (not shown) in display 32 is controlled by cursor location information also provided by secondary controller 120. As indicated by box 402, microcontroller 300 constantly monitors whether a data report from remote controller 50 is being received by IR detector 178. If no such report is received, the control allocation process loops back to box 400. If it appears a data report is being received from remote controller 50, microcontroller 300 assesses if the report contains a valid identification pulse sequence for identifying the remote controller, as indicated by box 404. If no valid identification sequence is received, the control allocation process loops back to box 400. If the data report contains a valid pulse identification sequence, then the control allocation proceeds to box 406. At this step, microcontroller 300 provides a power-down command to power switch 310 which then cuts off power to controller 120. Thereafter, as indicated by box 408, control is allocated to remote controller 50.

Referring to box 410, microcontroller 300 determines if IR signal 60 from remote controller 50 contains, and continues to contain, data. Depending upon the specific device used as remote controller 50, this data receipt assessment may be performed in several ways. In the preferred embodiment, microcontroller 300 determines if more than two successive data packets are absent from the report provided via IR signal 60. Such assessment is performed based on the knowledge that data packets are separated by a predetermined time interval, e.g., 33 msec. Microcontroller 300 performs this monitoring step until it determines two successive data packets are missing. When microcontroller 300 determines two successive data packets are absent, then the control allocation process proceeds to step 412, as described in more detail below. For other devices that may be used as remote controller 50, the preamble controller identification pulse sequence also defines the length and number of following data packets. Thus, upon receipt of such an identification sequence, microcontroller 300 advances to step 412 in the control allocation process upon passage of the known amount of time necessary to transmit such data packets.

At step 412, microcontroller 300 provides a power-up command to power switch 310 which reactivates controller 120. Thereafter, the control allocation process returns to step 400, where primarily controller 100 is again controlled by secondary controller 120.

As noted above, remote controller 50 may be a relative pointing device of the type described in the '268 and '630 Patents, or may be an absolute pointing device of the type described in the '348 Patent. As those of ordinary skill in the art appreciate, unique device drivers must be loaded on electronic apparatus 30 for each peripheral used with the apparatus. Because users often prefer not to load such drivers in electronic apparatus 30, it may be desirable to program microcontroller 300 so that the cursor location, select commands and other information provided by remote controller 50 is converted by the microcontroller into relative cursor information in a form usable by popular device drivers. An example of one such driver, distributed by Microsoft Corporation, Redmond, Wash., is the driver for the Microsoft mouse. When microcontroller 300 is so programmed, primary controller 100 may be plugged into electronic apparatus 30 via cable 116 and will immediately operate as intended.

When conventional device drivers intended for use with a peripheral that provides relative cursor location information are loaded in electronic apparatus 30, microcontroller 300 merely converts such information provided by remote controller 50 into the format required by the device driver. However, when remote controller 50 provides absolute cursor location information, such information must first be converted into relative cursor location information and then must be converted to the format of the device driver. Conversion from absolute to relative cursor location format is achieved by first determining the change in X-Y coordinate location information contained in the last data packet provided in IR signal 60 relative to the X-Y coordinate location information contained in the immediately preceding data packet. This change is then converted into relative cursor location information by equating the absolute change in X coordinates and Y coordinates to relative cursor location change commands, e.g., move the cursor 5 pixels to the left and 4 pixels down, via a look-up table, an algorithm or other known techniques. Finally, the relative cursor location information is formatted for the device driver installed in electronic apparatus 30.

In some cases, it may be desirable to provide information from electronic apparatus 30 to remote controller 50. Such information may include, for example, settings for X and Y coordinate limits. To this end, following receipt of information from electronic apparatus 30 via communication bus 110 and communication bus interface 150, analog and digital electronics 152 provides such information in the form of an IR drive signal to IR emitter 170. The latter then generates an IR signal 70 containing such information which is received by remote controller 50.

While the preferred embodiment of primary controller 100 features control allocation between secondary controller 120 and remote controller 50, those skilled in the art will appreciate that by appropriate programming of microcontroller 300 IR signal communication section 104 may simultaneously provide information from secondary controller 120 and remote 50 to electronic apparatus 30 using known multiplexing or other techniques.

Analog and digital electronics 152 has been described as including microcontroller 300. As an alternative, an ASIC chip having logic designed to emulate the operation of a selected microcontroller may be used instead. Furthermore, the function of control chip 122 in secondary controller 120 may also be included in such an ASIC chip.

Referring now to FIGS. 1–5, remote communication system 20 may be used to provide information to electronic apparatus 30 in two ways. First, cursor position information and select commands may be provided using primary controller 100 in the same way such information and commands are provided to an electronic apparatus using a conventional mouse, trackball, joystick, cursor key or other device. As housing 190 is moved by the user's hand, controller 120 converts such movement into relative cursor position information which is provided via communication section 104 and communication bus 110 to cable 116 and on to electronic apparatus 30. Select commands provided by the user to primary controller 100 are provided in similar to manner to electronic apparatus 30.

In the other mode of operation, cursor position information, select commands, and for certain embodiments, other data, may be provided using remote controller 50. The manner in which such information, commands and data are provided to electronic apparatus 30 differs from the manner in which known remote control devices provide information to an electronic apparatus. More particularly, when a user operates remote controller 50, cursor location, select commands and other information is transmitted via IR signal 60 to primary controller 100. With known remote controllers used with known electronic devices, a separate receiver positioned adjacent or on top of the electronic device is required to receive the output of the remote controller and provide it to the electronic device. The use of a separate device is often undesirable from the standpoint of aesthetics, desktop crowding and added expense. As to the latter advantage, the cost of modifying an existing peripheral device such as a mouse to permit receipt of IR signal 60, as described above in connection with the preceding description of primary controller 100, is typically less than that of a separate device for providing such function.

Describing the mode of operation involving the use of remote controller 50 in more detail, when the latter provides relative cursor location information, this information is provided via IR signal 60 to IR detector 172. Following conversion of information in IR signal 60 from analog to digital form, either at IR detector 178 or at microcontroller 300, depending upon whether the IR detector is capable of providing this function, the microcontroller then allocates control to remote controller 50, as described above in connection with FIG. 5. Microcontroller 300 then converts the cursor location, select commands and other information in IR signal 60 into the appropriate format for the device driver used in electronic apparatus 30 when relative cursor location information is received from remote controller 50. When absolute cursor location information is received from remote controller 50, microcontroller 300 may be programmed to first convert such information into relative cursor location information and then format the information for the device driver used in electronic apparatus 30. Alternatively, when device drivers that support absolute cursor location information are loaded in electronic apparatus 30, then the absolute cursor location information is only formatted for the device driver.

Regardless of the form in which the information is provided by microcontroller 300, such information is converted as necessary by communication bus interface 150, as described above, and is then provided via communication bus 110 and cable 116 to electronic apparatus 30. This communication continues for so long as data is received from remote controller, and may also involve the transfer of data from electronic apparatus 30 to primary controller 100 and/or remote controller 50. Once primary controller 100 establishes that information is no longer being provided by remote controller 50, control is returned to the primary controller.

Thus, the output signal from primary controller 100 provided via communication bus 110 comprises cursor location, select commands and other information from one of two sources: secondary controller 120 or remote controller 50. Although control is typically allocated between these two sources, as described above, in certain applications it may be desirable through multiplexing or other known techniques to provide information from these two sources simultaneously.

While the present invention has been described in connection with the preferred embodiments, it will be understood that it is not so limited, but rather is intended to cover all alternatives, modifications, and equivalents as may be included within the spirit and scope of the invention described and claimed herein.

What is claimed is:

1. A controller system for providing information to an electronic apparatus, the system comprising:
   a. a remote controller for providing a first infrared signal containing information usable by the electronic apparatus; and
   b. a primary controller connectable to the electronic apparatus, said primary controller having:
      i. a secondary controller with:
         1. at least one movable element;
         2. a transducer associated with said at least one movable element for providing a second signal containing information regarding the position of said at least one movable element; and
      ii. an IR communication section connected to said transducer (1) for receiving said first infrared signal, (2) for generating a third signal containing information in said first infrared signal and (3) for providing a fourth output signal comprising at least one of said second and third signals.

2. A system according to claim 1, wherein the electronic apparatus has a display that includes a cursor, further wherein said remote controller includes means for providing cursor location information in said first infrared signal that is usable by the electronic apparatus to control the location of the cursor.

3. A system according to claim 2, wherein said cursor location information is relative cursor location information.

4. A system according to claim 2, wherein said cursor location information is absolute cursor location information.

5. A system according to claim 4, wherein said remote controller includes a receiver for receiving a fifth infrared signal and said primary controller includes a transmitter for providing said fifth infrared signal.

6. A system according to claim 5, further wherein said IR communication section includes means for providing a signal from the electronic apparatus to said transmitter in a form that can be included in said fifth infrared signal.

7. A system according to claim 1, wherein said primary controller further includes a cable connectable with the electronic apparatus for providing said fourth output signal to the electronic apparatus.

8. A system according to claim 1, wherein said remote controller is a wireless mouse.

9. A system according to claim 1, wherein said remote controller is a wireless trackball.

10. A system according to claim 1, wherein said remote controller is a wireless keypad.

11. A system according to claim 1, wherein said remote controller is an absolute position pointer.

12. A system according to claim 1, wherein said secondary controller includes control allocation means for selecting one of said second and third signals and including only said selected one in said fourth output signal.

13. A system according to claim 12, wherein said control allocation means monitors said third signal to determine if a data message is present and includes only said third signal in said fourth signal upon detection of said data message.

14. A system according to claim 12, wherein said secondary controller removes power from said transducer when said control allocation means determines said data message is present.

15. A system according to claim 1, wherein said secondary controller includes an IR emitter and an IR detector.

16. A system according to claim 4, wherein said IR communication section includes means for converting said absolute cursor location information to relative cursor location information prior to providing said fourth output signal.

17. A controller for providing information to an electronic apparatus, which information, in part, may comprise information in a first infrared signal provided by a peripheral device, the controller comprising:
   a. at least one movable element;
   b. a transducer associated with said movable element for providing a second signal containing information regarding the position of said movable element; and
   c. IR means connected to said transducer (i) for receiving the first infrared signal and for generating a third signal containing information in said first infrared signal and (ii) for providing a fourth output signal comprising at least one of said second and third signals.

18. A controller according to claim 17, wherein the peripheral device includes a receiver for receiving a fifth infrared signal, further wherein said IR means includes a transmitter for providing said fifth infrared signal.

19. A controller according to claim 17, wherein said controller further includes a cable connectable with the electronic apparatus for providing said fourth output signal to the electronic apparatus.

20. A controller according to claim 17, wherein said IR means includes control allocation means for selecting one of said second and third signals and including only said selected one in said fourth output signal.

21. A system according to claim 20, wherein said control allocation means monitors said third signal to determine if a data message is present and includes only said third signal in said fourth signal upon detection of said data message.

22. A system according to claim 20, wherein said secondary controller removes power from said transducer when said control allocation means determines said data message is present.

23. A system according to claim 17, wherein said secondary controller includes an IR emitter and an IR detector.

24. An electronic apparatus comprising:
   a. a device for processing information;
   b. a remote controller for providing a first infrared signal containing information usable by said device; and
   c. a primary controller connected to said device, said primary controller having:
      i. at least one movable element;
      ii. a transducer associated with said at least one movable element for providing a second signal containing information regarding the position of said at least one movable element; and
      iii. an IR communication section connected to said transducer (1) for receiving said first infrared signal, (2) for generating a third signal containing information in said first infrared signal and (3) for providing a fourth output signal comprising at least one of said second and third signals.

* * * * *